United States Patent
Imae et al.

(10) Patent No.: US 11,788,278 B2
(45) Date of Patent: Oct. 17, 2023

(54) HIGH TEMPERATURE-HEAT INSULATOR

(71) Applicant: IMAE INDUSTRY CO., LTD, Osaka (JP)

(72) Inventors: Kenji Imae, Osaka (JP); Yoshihiko Imae, Osaka (JP); Yasuki Masunaga, Osaka (JP)

(73) Assignee: IMAE INDUSTRY CO., LTD., Osaka (JP)

( * ) Notice: Subject to any disclaimer, the term of this patent is extended or adjusted under 35 U.S.C. 154(b) by 0 days.

(21) Appl. No.: 18/076,911

(22) Filed: Dec. 7, 2022

(65) Prior Publication Data

US 2023/0107069 A1 Apr. 6, 2023

Related U.S. Application Data

(63) Continuation of application No. 17/051,633, filed as application No. PCT/JP2019/026400 on Jul. 3, 2019, now Pat. No. 11,585,084.

(30) Foreign Application Priority Data

Jul. 9, 2018 (JP) .................................. 2018-129838

(51) Int. Cl.
*E04B 1/76* (2006.01)
*B32B 15/14* (2006.01)
(Continued)

(52) U.S. Cl.
CPC ............ *E04B 1/7666* (2013.01); *B32B 15/14* (2013.01); *B32B 17/02* (2013.01); *D04H 1/4209* (2013.01);
(Continued)

(58) Field of Classification Search
CPC ....... E04B 1/7666; B32B 15/14; B32B 17/02; B32B 2262/10; B32B 2307/304;
(Continued)

(56) References Cited

U.S. PATENT DOCUMENTS 5,645,926 A * 7/1997 Horrocks ............ D06M 15/233
428/920
7,896,943 B2 3/2011 Witschen et al.
(Continued)

FOREIGN PATENT DOCUMENTS

| JP | 2006-077551 | 3/2006 |
|---|---|---|
| JP | 4728506 | 7/2011 |
| JP | 2017-071084 | 4/2017 |

OTHER PUBLICATIONS

ISR issued in WIPO Patent Application No. PCT/JP2019/026400, Oct. 8, 2019, translation.

*Primary Examiner* — Brian Handville
(74) *Attorney, Agent, or Firm* — GREENBLUM & BERNSTEIN, P.L.C.

(57) ABSTRACT

Disclosed is a heat insulator comprising a substrate comprising of a bulk of silica-based inorganic fiber containing a hydroxyl group; a metallic or ceramic infrared mediator held on at least a part of one surface of the substrate; and a silica cured product holding the infrared mediator on/in the substrate. As the infrared mediator, a metal foil or a ceramic particle may be used. This heat insulator exhibits excellent heat insulating performance in a high temperature range of 600° C. or more, and can be molded into a three-dimensional shape which can be directly mounted to a structure.

15 Claims, 6 Drawing Sheets

(51) Int. Cl.
*B32B 17/02* (2006.01)
*D04H 1/4209* (2012.01)

(52) U.S. Cl.
CPC ..... *B32B 2262/10* (2013.01); *B32B 2307/304* (2013.01)

(58) Field of Classification Search
CPC .... B32B 1/02; B32B 1/08; B32B 5/06; B32B 5/08; B32B 2250/03; B32B 2250/40; B32B 5/022; B32B 5/028; B32B 5/10; B32B 15/18; B32B 15/20; B32B 2250/02; B32B 2255/02; B32B 2255/06; B32B 2255/20; B32B 2260/021; B32B 2260/04; B32B 2262/101; B32B 2262/14; B32B 2264/107; B32B 2307/102; B32B 2307/306; B32B 2307/406; B32B 2307/416; B32B 2307/72; B32B 2307/732; B32B 2457/00; B32B 2605/08; D04H 1/4209; D04H 1/558; D04H 1/587; F16L 59/02

See application file for complete search history.

(56) References Cited

U.S. PATENT DOCUMENTS

| | | | |
|---|---|---|---|
| 2004/0253406 A1* | 12/2004 | Hayashi | B32B 3/04 428/69 |
| 2016/0040045 A1 | 2/2016 | Morita et al. | |
| 2016/0084140 A1 | 3/2016 | Dietz | |
| 2017/0165943 A1* | 6/2017 | Kim | B32B 5/022 |
| 2017/0205117 A1* | 7/2017 | Fernando | B32B 5/08 |
| 2018/0134002 A1* | 5/2018 | Brahms | B32B 7/09 |
| 2018/0147793 A1* | 5/2018 | Arvidson | B32B 5/24 |

\* cited by examiner

[FIG. 1]
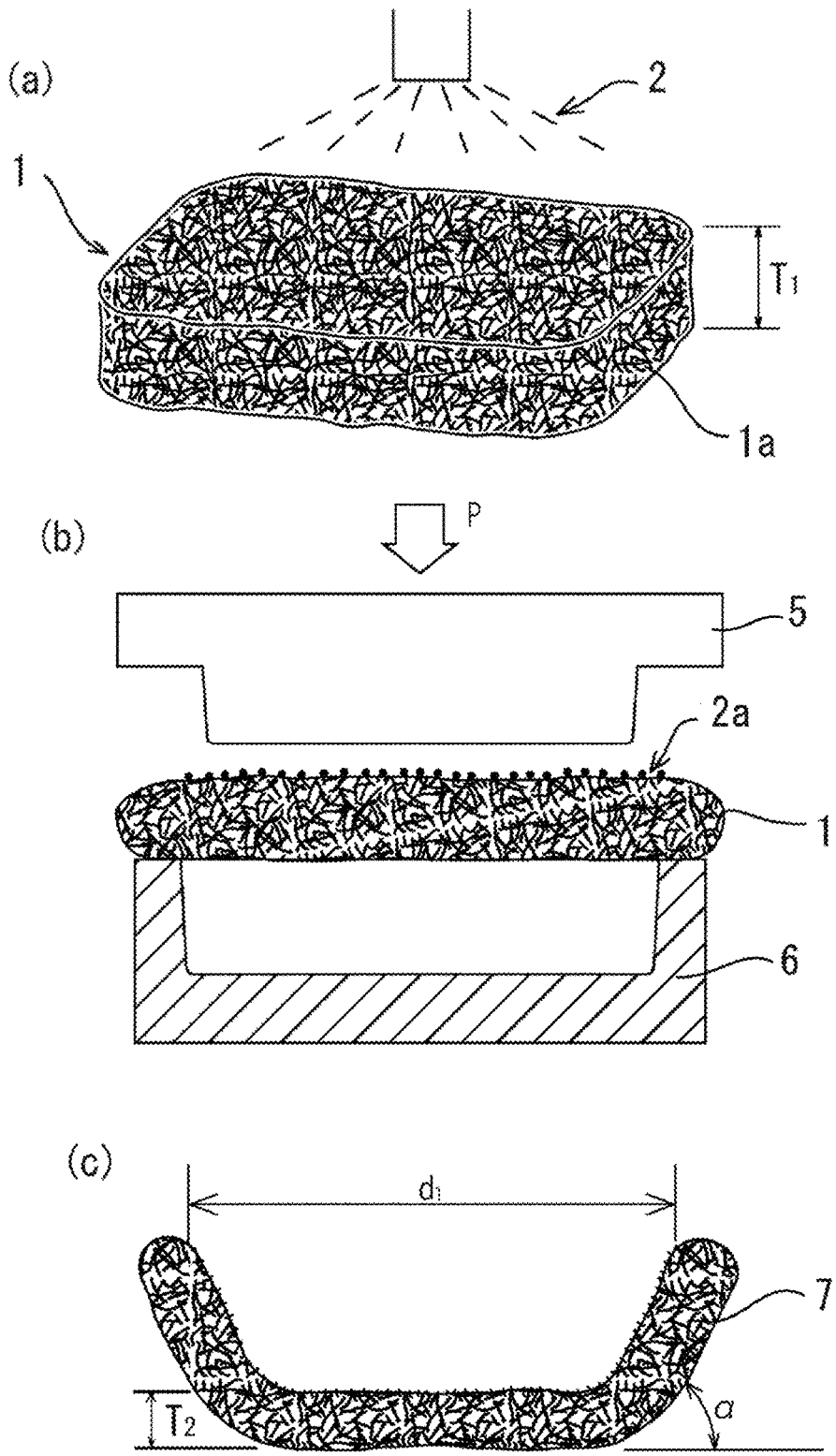

[FIG. 2]
(a)
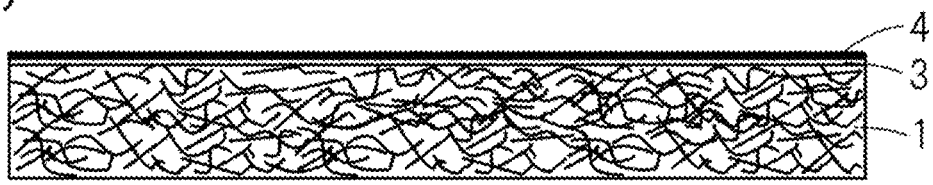
(b)
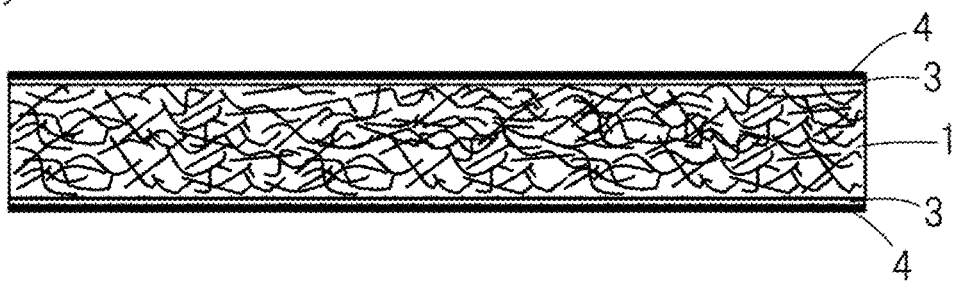

[FIG. 3]
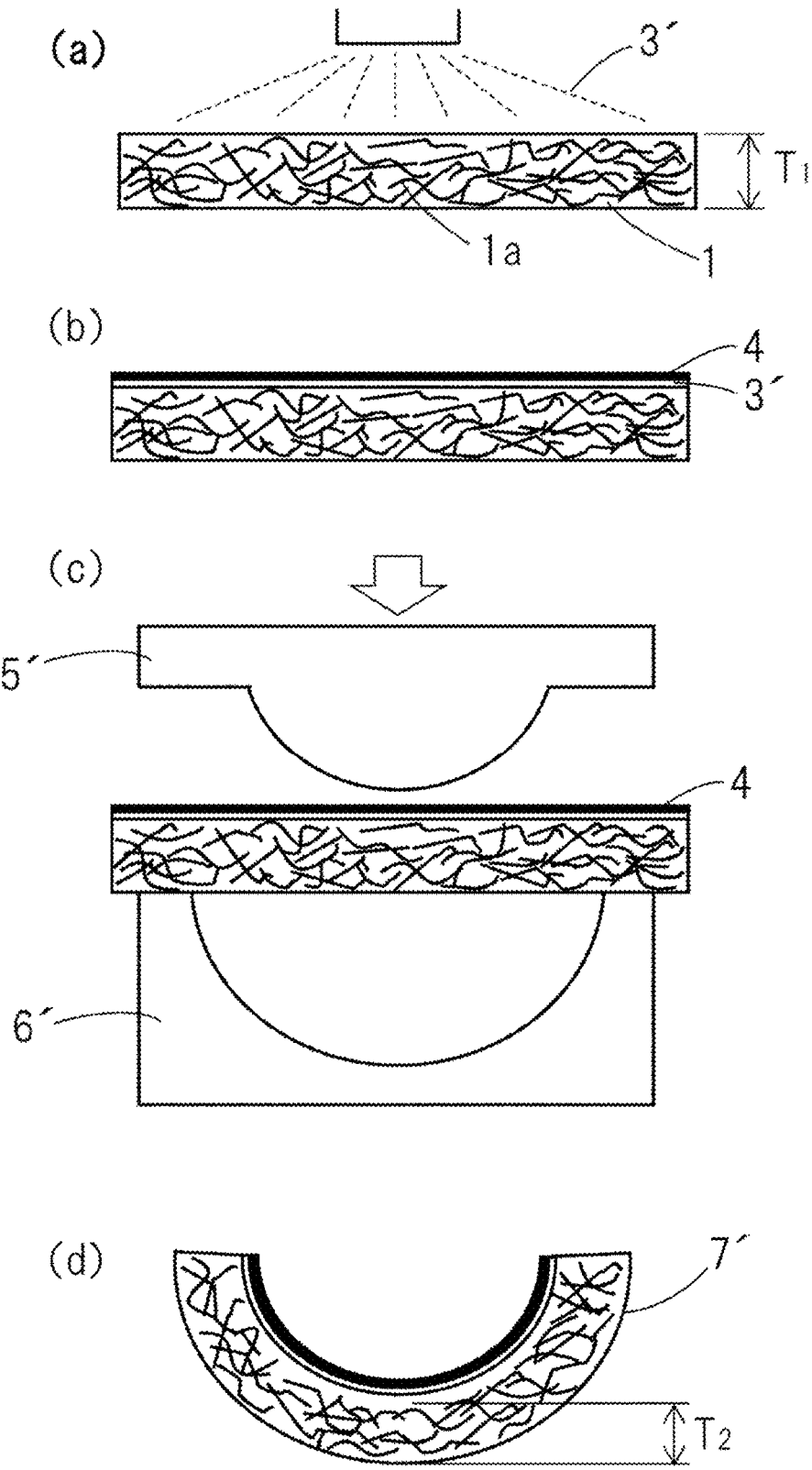

[FIG. 4]
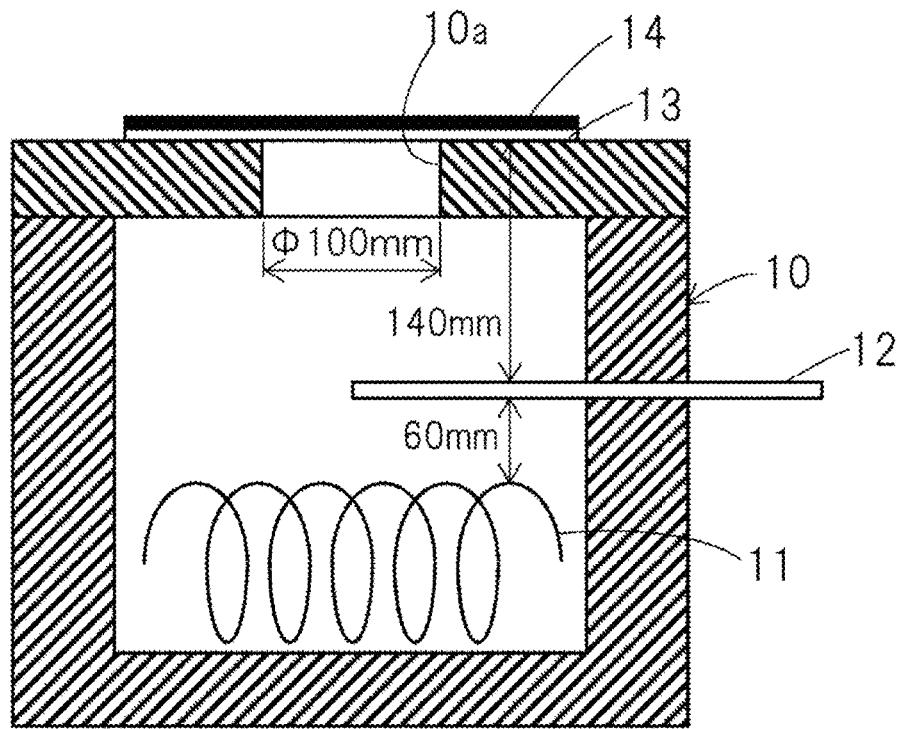
[FIG. 5]
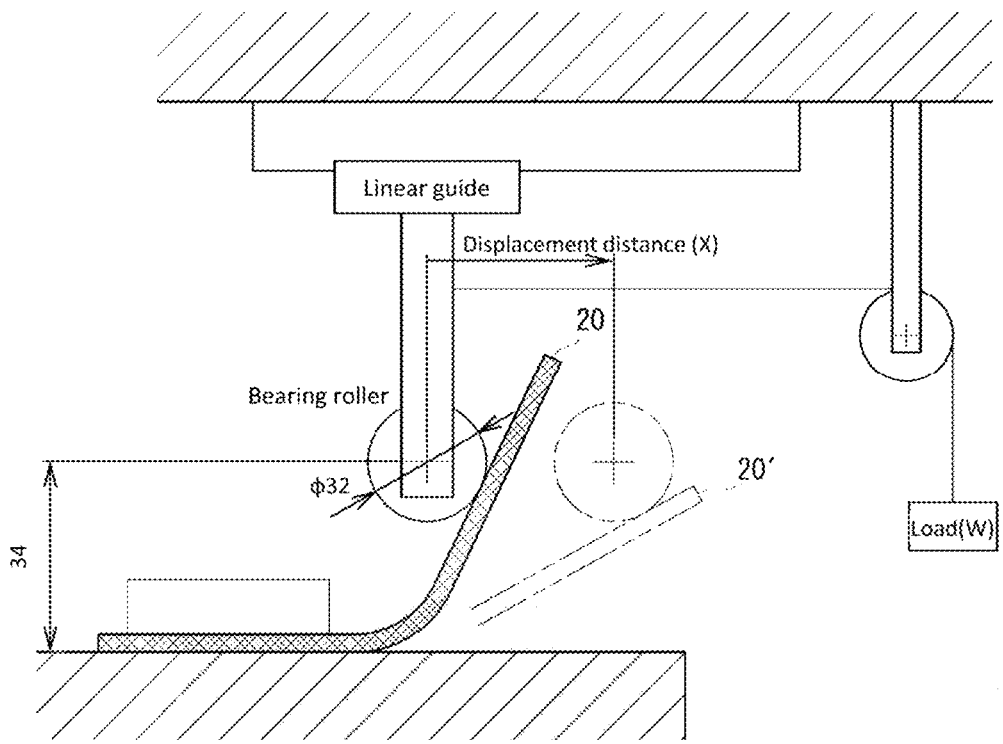

[FIG.6]
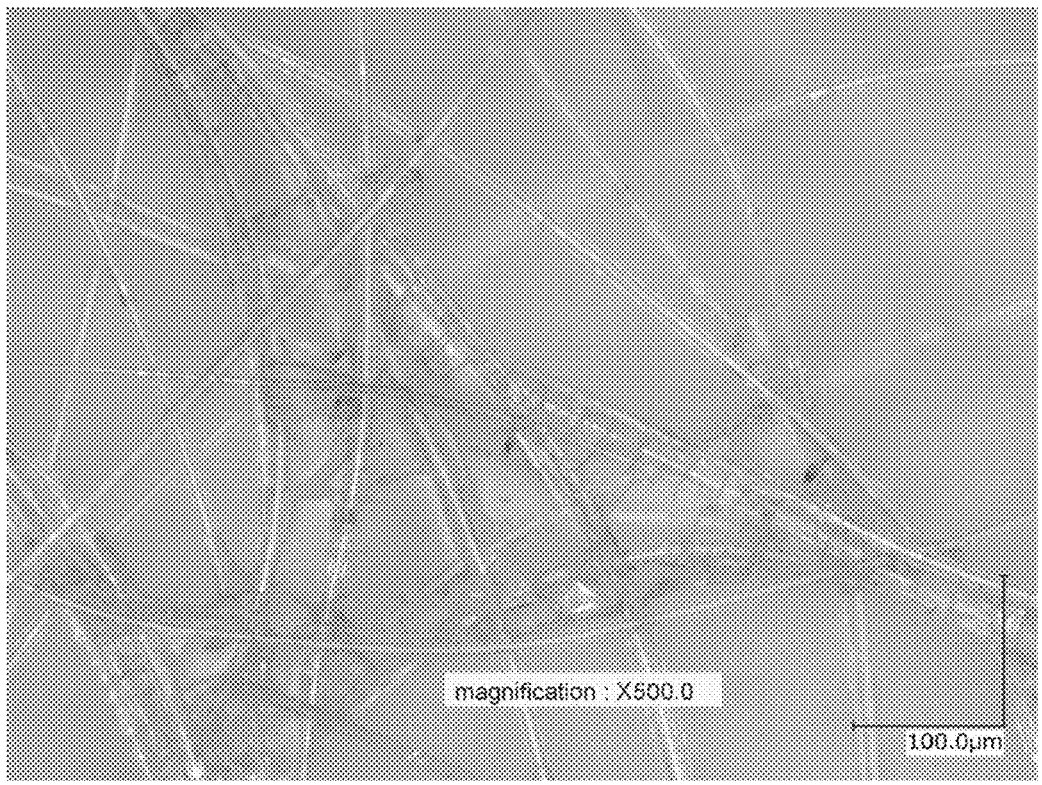
[FIG.7]
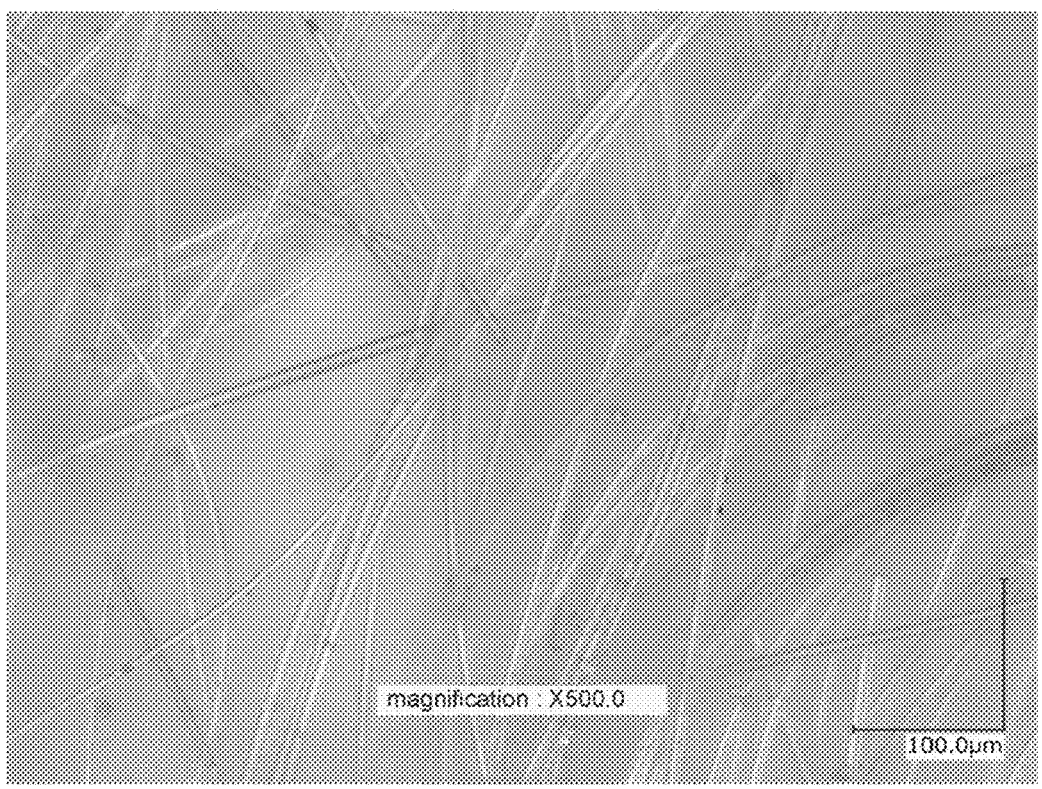

【FIG.8】
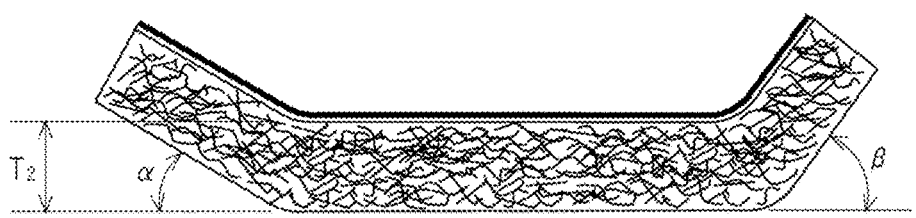
【FIG.9】
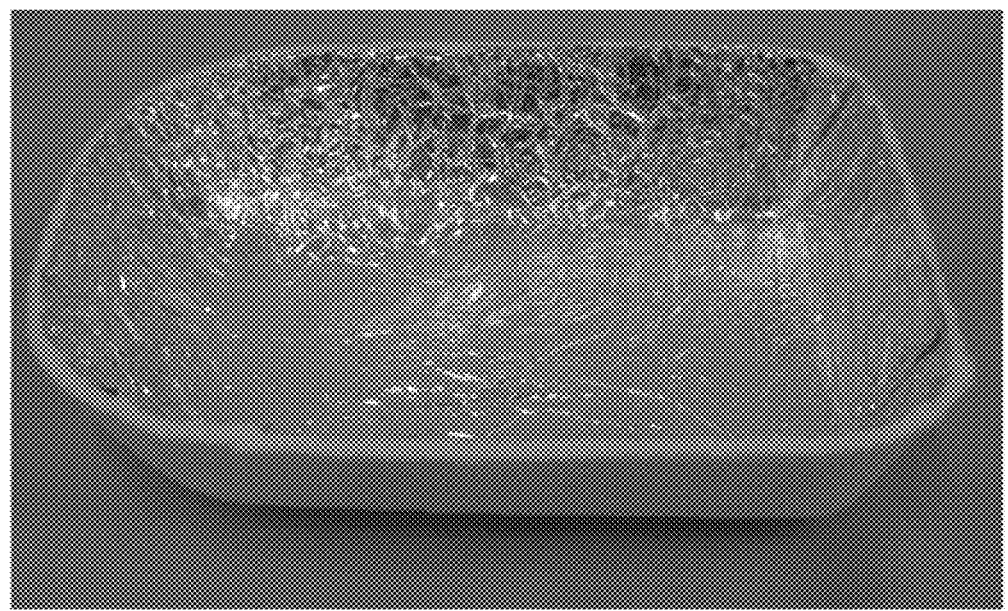

HIGH TEMPERATURE-HEAT INSULATOR

This application is a Continuation of U.S. patent application Ser. No. 17/051,633, filed Oct. 29, 2020, which is a National Stage Entry of International Patent Application No. PCT/JP2019/026400, filed Jul. 3, 2019, which claims the benefit of Japanese Patent Application No. 2018-129838, filed Jul. 9, 2018. The disclosure of each of the applications listed above is incorporated by reference herein in its entirety.

TECHNICAL FIELD

The present invention relates to an inorganic fibrous heat insulator exhibiting excellent heat insulating performance at temperatures higher than 600° C., and a method for manufacturing a three-dimensionally shaped heat insulator.

BACKGROUND

A device such as a manifold of a motorcycle or automotive, in which a catalyst reaction occurs at a high temperature, is normally covered with a heat insulator for saving thermal energy to secure a reaction efficiency at the high temperature, and for avoiding the affection of the high temperature on a device's environment. In recent years, a nonwoven fabric or a mat of inorganic fiber such as mineral fiber or glass fiber has been used as a heat insulator due to its lightweight and flexibility. The nonwoven fabric or mat is wrapped around the device for insulation.

However, wrapping the fiber fabric or mat around the device or acoustic absorber is time consuming and labor extensive. So reducing the time and labor in the process of covering with an insulator is desired. Additionally, a molded heat insulator having a configuration fitting to the outer shape of the target device is requested from the operation site in order to achieve a better fitting to the device and improve heat retaining efficiency. In response to the request, proposed is a method for manufacturing an insulator which has a configuration fitting to the target device by molding an inorganic fibrous web or a flat substrate such as fiber mat and blanket into the configuration.

JP4728506B (Patent Document 1) discloses a method for producing a molded article, in which a fibrous web of glass fibers are compressed to a desired shape and kept at a temperature lower than the softening point by 10-100° C. to melt the contact points between glass fibers, followed by cooling down to solidify the molten contact points of the glass fibers, thereby fixing the shape formed by compression molding.

In this method, glass fibers are fused for molding by heating and pressurizing cotton- or felt-like web of glass fibers.

The glass fiber needs to be melted at least its surface during fusion molding. According to the method disclosed in the patent document 1, the fusion molding is performed by heating for 10 minutes or more at a high temperature capable of melting glass fiber, specifically, under the condition of 780° C. for 30 minutes (first embodiment) or a temperature of 780 to 810° C. for 15 minutes (second embodiment). However, keeping such a high temperature above 700° C. for at least 15 minutes increases the cost of the production and hinders the improvement in productivity at a production site. For these reasons, the method may not be acceptable.

Also, as a method for manufacturing a molded heat insulator used in a high temperature, U.S. Pat. No. 7,896,943 (Patent Document 2) proposes a method for producing a conical molded article by placing a binderless web of silica-based glass fiber containing $Al_2O_3$ in a mold, and then heating at a temperature between 400° F. (204.4° C.) and 1300° F. (704.4° C.) and keeping the temperature for 6 minutes, thereby forming the web into the conical shape.

Since the silica-based glass fiber containing $Al_2O_3$ used herein is resistant to a temperature up to 2000° F. (about 1000° C.) and can be molded without binder, the resultant molded heat insulator can be applied at high temperatures based on the excellent heat resistance of the glass fiber.

On the other hand, selection of an appropriate heating time duration is necessary according to the heating temperature. Table 1 shows that molding under the condition of 1 minute at 1112° F. (600° C.) and 3 minutes at 700° F. (371° C.) could not provide a molded article having a desired shape.

Moreover, an inorganic nonwoven fabric or mat made of bulk of mineral- or glass-staple fiber usually contain a shorter fiber than the chopped fiber and/or shot. The shorter fiber is occurred in the production of the fabric or mat. The shot is non-fiberized pieces still remained after the production of fibers by a blowing method or a spinning method. Such shorter fibers or shots raise a problem to scatter in the use or application of the nonwoven fabric or the mat of inorganic fibers.

In order to solve these problems, it has been proposed to cover the fibrous bulk such as a nonwoven fabric or a mat with metal film.

For example, JP2006-77551A (Patent Document 3) discloses a noncombustible foamed heat insulator in which a foamed substrate is united with a thin metallic layer at least one surface of the foamed substrate through a binder layer. The foamed substrate is formed by entangling a mixture of polyester fiber and a fibrous binder having a melting point lower than the polyester fiber to form into a nonwoven fabric, and then compression-molding the nonwoven fabric into a mat.

This noncombustible foamed heat insulator is not useful for a heat insulator used at a temperature of 200° C. or higher regardless of its noncombustibility based on the cover of aluminum foil because the foamed substrate includes polyester fiber.

As a refractory heat insulator applicable to a thermal source having a high temperature of 300° C. or higher, for example, JP2017-71084A proposes a refractory heat-shielding sheet. The heat shielding sheet comprises of plies as a substrate and a bag made of silica-fiber woven fabric which packages the plies. The ply comprises a heat-resistant nonwoven fabric of silica-based inorganic fiber containing a hydroxyl group, and metal layer such as metal foil or metal vapor-deposited film, the metal layer being placed over both sides of the heat-resistant nonwoven fabric. The refractory heat-shielding sheet is durable in use even at 600° C. thanks to excellent heat resistance of the bag and the nonwoven fabric used as the substrate. Further, since the nonwoven fabric which is a bulk of inorganic fibers is housed in the bag, staple fibers do not scatter.

The laminated state of the plies in which the metal layer disposes on the nonwoven fabric is secured by housing the plies in the bag. Therefore, if the bag is broken, the laminated state is no longer kept. Furthermore, since the laminated state is not stably fixed, the operation for housing the plies into a bag and sealing the opening of the bag is troublesome. Under the situations, a refractory heat insulator produceable without a bag is desired for improving the productivity.

PRIOR ART

Patent Document

Patent Document 1: JP4728506B
Patent Document 3: US7896943
Patent Document 3: JP2006-77551A
Patent Document 4: JP2017-71084A

SUMMARY OF THE INVENTION

Technical Problem to be Solved by the Invention

As described above, the heat insulator made of inorganic fibers can be used at high temperatures and can satisfy the flexibility requirement. However, as for the production of a molded heat insulator of inorganic fibers, a binderless method such as a fusion-molding method utilizing fusion of glass fibers is time consuming and is unsatisfactory in terms of productivity.

According to the method of heat setting with use of a special glass fiber as proposed in the patent document 2, time duration for heat setting can be shortened without impairing the heat resistance at high temperatures inherent in glass fiber, but reducing the time duration to 5 minutes or less has not been achieved yet. The reduction of the time duration to below 5 minutes is required from the production site for productivity.

A nonwoven fabric or a mat formed by entangling fibers has a large porosity and large pores. Thus the nonwoven fabric or a mat requires a large amount of energy for keeping high temperatures because of the leakage of radiant thermal energy through the pores.

Under these situations, the present invention has been achieved. The purpose of the invention is to provide an inorganic fiber heat insulator having excellent heat resistance usable at a temperature above 600° C., and capable of directly forming into a three-dimensional shape fitting to a device used for high temperatures. Also, the present invention is to provide a method of imparting a three-dimensional shape within 5 minutes so as to satisfy a requirement of productivity.

Means for Solving the Problem

The heat insulator for high temperature of the invention comprises a substrate comprising of a bulk of silica-based inorganic fiber containing a hydroxyl group; a metallic or ceramic infrared mediator held on at least a part of one surface of the substrate; and a silica cured product holding the infrared mediator on/in the substrate.

The infrared mediator is a metal foil having a thermal emissivity of 0.3 or less or a ceramic particle having a thermal emissivity of 0.6 to 0.9.

Therefore, according to one aspect of the invention, embodiments of the high-temperature-heat insulator of the invention includes (I) metal foil-adhering type heat insulator wherein the infrared mediator is a metal foil having a thermal emissivity of 0.3 or less, and the silica cured product is a solidified material containing a layered silicate and silica powder;

(II) particle dispersion type heat insulator wherein the infrared mediator is a ceramic particle having a thermal emissivity of 0.6 to 0.9, and the silica cured product is an inorganic polymer containing siloxane bond; and (III) a combination type heat insulating material having both embodiments (I) and (II).

In the embodiment (I), the metal foil is preferably adhered to the surface on the opposite side to a thermal source to be insulated. In the embodiment (II), the ceramic particles are preferably held on/in the surface which faces a thermal source to be insulated.

According to the invention, the method for manufacturing a high temperature-heat insulator having a three-dimensional shape from a flat substrate of a silica-based inorganic fiber containing a hydroxyl group, comprising steps of A) providing the flat substrate with an infrared mediator by the step a-1) and/or a-2): and
  a-1) coating, applying, spraying or impregnating a colloidal solution in which amorphous silica particles and particulate infrared mediator are dispersed in an aqueous medium,
  a-2) coating, applying, spraying or impregnating a suspension or paste each containing a film-forming component and silica powder, on one surface of the flat substrate, and thereafter attaching a film-like infrared mediator to the surface;
B) heating and compressing the flat substrate to form into a three-dimensional shape.

Effect of the Invention

According to the heat insulator of the invention, the infrared mediator is held on a surface or surface layer of the fibrous substrate of silica-based inorganic fibers. Therefore, the infrared mediator may reflect or absorb infrared rays contributing to high temperature and may suppress the leakage of infrared rays to its surroundings. In addition to the effect of the suppression of the leakage by the infrared mediator, pores between fibers in the substrate may provide a heat insulating effect. Therefore, an excellent heat insulating effect can be obtained. Moreover, the silica cured product for holding the infrared mediator may support to sustain the imparted shape. Furthermore, in the case that the metal foil used as the infrared mediator is disposed to the external side of the heat insulator, the metal foil may suppress scattering of the short fiber and/or shot from the substrate, and may also suppress the intrusion of foreign matters such as dust and sand from its surroundings, as well as may avoid the foreign matter from attaching to the substrate.

According to the method of manufacturing the high temperature-heat insulator of the invention, not only the infrared mediator can be held in the substrate, but also a desired shape can be imparted to the heat insulator. Therefore, the method can provide a heat insulator having a desired three-dimensional shape with excellent productivity.

BRIEF DESCRIPTION OF THE DRAWINGS

FIG. 1 is a diagram for showing processes of manufacturing a particle dispersion type three-dimensionally shaped heat insulator.

FIG. 2 is a schematic diagram of a metal foil-adhering type heat insulator.

FIG. 3 is a diagram for showing processes of manufacturing metal foil-adhering type three-dimensionally shaped heat insulator.

FIG. 4 is a schematic diagram for showing the method of evaluating heat insulating performance executed in Example.

FIG. 5 is a schematic diagram for showing a method of evaluating shape retention property executed in Example.

FIG. 6 is a microscope photograph of the particle dispersion type heat insulator.

FIG. 7 is a microscope photograph of a substrate alone.

FIG. 8 is a schematic diagram for showing the configuration of the metal foil-adhering type heat insulator prepared in Example.

FIG. 9 is a photograph of the metal foil-adhering type heat insulator prepared in Example.

EMBODIMENT FOR CARRYING OUT THE INVENTION

The high temperature-heat insulator of the invention comprises a substrate comprising of a bulk of silica-based inorganic fibers containing a hydroxyl group; a metallic or ceramic infrared mediator held on at least a part of one surface of the substrate; and a silica cured product holding the infrared mediator in/on the substrate.

Each component will be described below.

[Substrate]

The substrate used in the invention is a bulk of silica-based inorganic fiber containing a hydroxyl group. The bulk is normally in a form of nonwoven fabric, mat, felt, or the like, in which filaments or staples of a silica-based inorganic fiber containing a hydroxyl group are entangled. Among these, a needle-punched mat is preferable. The needle-punched mat is formed by needle punching a flat web to entangle the fibers and stabilize the web with a certain thickness.

Not only one kind of the silica-based inorganic fiber, but also a combination of two or more of them may be used for the substrate.

A preferable silica-based inorganic fiber containing a hydroxyl group for the substrate is silica fiber containing 0.1-20% of $Al_2O_3$ and 80-99.9% of $SiO_2$. The silica-based inorganic fiber is appropriate due to excellent compatibility to water glass (sodium silicate solution) and silica particles, which are primary components of binder. The silica-based inorganic fiber is also compatible to silicate as a film-forming component.

The silica-based inorganic fiber containing a hydroxyl group is a heat-moldable glass fiber containing 81 wt % or more of $SiO_2$, and containing Si(OH) in a part of SiO-based network. The hydroxyl group seems to be remained in the production of filament or staple fiber from a starting glass material by proton exchange of a metal or metal oxide ion (e.g. $Al^{3+}$, $TiO^{2+}$, $ZrO^{2+}$ or $Zr^{4+}$) contained in the starting glass material. The hydroxyl groups contained in the silica-based inorganic fiber form a new siloxane bond (Si—O—Si bond), and release $H_2O$, through a condensation reaction at about 600-800° C., as indicated by the formula (1) below.

[Formula 1]

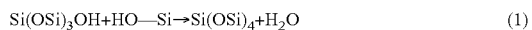

$$Si(OSi)_3OH+HO—Si \rightarrow Si(OSi)_4+H_2O \quad (1)$$

A typical silica-based inorganic fiber containing hydroxyl group has a composition represented by $AlO_{1.5} \cdot 18[(SiO_2)_{0.6}(SiO_{1.5}OH)_{0.4}]$. A commercially available fibers may be used. For example, BELCOTEX® from BELCHEM GmbH may be used.

The BELCOTEX® fiber is typically made from silicic acid-modified with alumina. A standard type of staple fiber preyarn has an average fineness of about 550 tex. The BELCOTEX® fiber is amorphous and generally contains about 94.5 wt % of silica, about 4.5 wt % of alumina, less than 0.5 wt % of an oxide, and less than 0.5 wt % of other components. The fiber has an average diameter of about 9 μm with little variation, a melting point of 1500 to 1550° C., and heat resistance up to 1100° C.

Silica-based inorganic fibers containing hydroxyl groups other than BELCOTEX® may be used by an appropriate selection according to the purpose of its use and application.

The diameter of the silica-based inorganic fiber is from 6 to 13 μm, preferably from 7 to 10 μm. The length of the inorganic fiber depends on the form (felt, nonwoven fabric, blanket, sheet, etc.) of the substrate. The staple fiber having a length of commonly from 1 to 50 mm, preferably from 3 to 30 mm or the filament having a length of commonly from 30 to 200 mm, preferably from 50 to 150 mm, may be used.

When a needle-punched mat is used for the substrate, a preferable fiber length is from 30 to 130 mm, more preferably 45 to 100 mm from the viewpoint of mat formability by needle-punching.

The fiber sheet or flat web for a substrate has a thickness of about 3 to 25 mm, preferably 3 to 12 mm, and more preferably 4 to 10 mm. In the case of producing by compression molding, the use of an unduly thin sheet or web may provide an insulator having an insufficient thickness so that the resulting insulator may not achieve a desired heat insulating performance and/or sufficient strength. On the contrary, the use of an unduly thick sheet or web tends to be difficult in forming into a desired shape and the resulting insulator tends to be poor in shape retention.

The density of the substrate is preferably from 80 kg/m³ to 180 kg/m³, and more preferably 90 kg/m³ to 160 kg/m³. If the density is too high, compression molding becomes difficult. On the other hand, if the density is too low, shape retention of the molded insulator is lowered, and the strength of the resulting insulator is insufficient. The heat insulating performance also tends to be lowered.

[Infrared Mediator]

The infrared mediator contributes to a heat insulating performance by absorbing or reflecting infrared rays, primarily near-infrared rays (wave length: about 1 μm to about 4 μm). The infrared rays are relevant to thermal energy at high temperatures.

The heat transfer is classified into three types: convection, conduction, and radiation. Among them, the ratio of heat transfer by radiation is relatively high at a temperature above 500° C. Therefore, the heat insulator to be used at high temperatures of 500° C. or more, preferably 600° C. or more, and more preferably 800° C. or more, is effective to suppress the leakage of the thermal energy near the thermal source to its surroundings. The infrared mediator used in the invention may prevent leakage of infrared rays emitted from the thermal source by reflecting them. Alternatively, the infrared mediator may absorb the thermal energy of the thermal source and radiate it in the vicinity of the thermal source, thereby suppressing the energy consumption of the thermal source.

According to an exemplary embodiment of the invention, the infrared mediator may be (1) a metal foil having a thermal emissivity (ε) of 0.3 or less used as a reflection type infrared mediator, or (2) a ceramic particle having a thermal emissivity of 0.6 to 0.9 used as an absorption type infrared mediator. These will be described in detail below.

(1) Reflection Type Infrared Mediator

As a reflection type infrared mediator, a metal foil having a thermal emissivity of 0.3 or less, preferably 0.2 or less, and more preferably 0.1 or less may be used. A metal having metallic luster may normally meet a thermal emissivity of 0.3 or less.

Metal foil covering one surface of the heat insulator can reflect infrared rays emitted from the thermal source and suppress leakage of infrared rays to its surroundings. In the case of a metal vapor-deposited film, a pinhole may be formed in the deposition layer of the metal depending on the thickness of the deposition layer. Alternatively, a metal layer formed by vapor deposition is readily to generate a pinhole when a three-dimensional shape is formed. The pinhole causes the leakage of infrared rays. On the other hand, metal foil is free from a pinhole before it is torn. Therefore, the metal foil can exhibit excellent reflection effect of the thermal energy from the thermal source.

When a heat insulator has a metal layer held on the thermal source side, a metal having a melting point equal to or higher than the thermal source temperature, preferably a metal having heat resistance as high as that of the substrate, may be used for the metal layer. Specifically, a melting point of the metal is 800° C. or higher, preferably 1000° C. or higher, more preferably 1200° C. or more, and still more preferably 1500° C. or higher. On the other hand, when a heat insulator has a metal layer held on the external side which is the opposite side to the thermal source, a metal having heat resistance lower than a metal foil held on the thermal source side may be applicable. Because the ambient temperature is lower than the thermal source temperature due to the heat insulating effect of the substrate. Therefore, a metal having a melting point of 400° C. or higher as well as 600° C. or higher may be used depending on the thermal source temperature and the kind of the substrate (particularly its thickness).

Examples of the metal foil to be used include aluminum foil, silver paper, titanium foil, stainless foil, nickel foil, copper foil, phosphor bronze foil, brass foil, nickel silver, permalloy foil, inconel foil, nichrome foil, molybdenum foil, zirconium foil, tantalum foil, tin foil, zinc foil, indium foil, niobium foil, lead foil, and plated iron foil.

The metal foil to be used may be appropriately selected according to characteristics such as melting point, ductility, and thickness, and the type of heat insulator in which the metal foil is used. In the case of three-dimensionally shaping, the metal foil to be used is appropriately selected taking into consideration the final shape, in particular, the size of R portion of the shaped insulator.

As the metal foil, aluminum foil, gold paper, copper foil, stainless steel foil, molybdenum foil, and inconel foil are preferably used because of their thermal emissivity of 0.3 or less and excellent ductility. Also, from the viewpoint of low thermal emissivity, a preferable metal foil is a specular glossy metal foil whose surface is not oxidized and is not subjected to matte processing.

The thickness of the metal foil is 5-150 μm, preferably 10-100 μm, and more preferably 20-50 μm. A metal foil as thin as 5 μm or less is poor in handling property and would be readily broken. On the other hand, a thick metal foil with a thickness above 150 μm is poor in ductility as well as in three-dimensional moldability.

(2) Absorption Type Infrared Mediator

As the absorption type infrared mediator, a ceramic particle having a thermal emissivity of 0.6 to 0.9, preferably 0.65 to 0.85, may be used.

A ceramic particle having an average particle size of 0.5 to 4 μm, preferably 1 to 3 μm, and more preferably 1 to 2.5 μm may be used. The average particle size is measured by the light scattering method. Preferably, the ceramic particles may have a cumulative 90% diameter ($D_{90}$) of 10 μm or less, preferably 8 μm or less, and more preferably 7 μm or less in particle size distribution. The ceramic particles falling in the size range can absorb infrared rays, especially near-infrared rays, and radiate it. Therefore, the consumption of thermal energy from the thermal source can be suppressed if the absorption type infrared mediator is contained in the heat insulator and is held at a closer portion to the thermal source.

Since a ceramic particle is placed near the thermal source for utilizing as an infrared mediator, it is preferable to select a ceramic particle which is hardly oxidized and molten even after long-term exposure to high temperatures. The ceramic particle should have a melting point of 1500° C. or higher, and includes carbides, nitrides, and borides. Carbon graphite has such a high melting point and high thermal emissivity, however, the carbon graphite particle may not be used as an infrared mediator. This is because the carbon graphite particle usually has emissivity ($\varepsilon$) higher than 0.95, and could not almost reflect infrared rays, which might overheat a limited portion around the carbon graphite particle. Moreover, carbon graphite has an extremely high thermal conductivity comparing to silica-based fibers and ceramic particles. Once the carbon graphite reaches a high temperature, heat transfer due to heat conduction through carbon graphite becomes large. On the other hand, a ceramic particle held in the silica cured product is capable of moderately reflecting infrared rays due to a refractive index difference between the ceramic particle and the silica cured product. Additionally, since the ceramic particle has a smaller thermal conductivity than that of metal or carbon graphite, the ceramic particle is likely to provide heat insulating effect due to its absorption or radiation of infrared rays. However, if the ceramic particle has an unduly large size, the ceramic particle itself may act as a heat emittance. For these reasons, the ceramic particle is preferable to have a size sufficient enough absorbing near-infrared rays.

Examples of ceramics used as an absorption type infrared mediator include carbides such as WC, TiC, SiC, and ZrC; nitrides such as TiN, ZrN, and TaN; borides such as CrB, $VB_2$, $W_2B_5$, WB, TaB, and MoB; and silicide such as TiSi, ZrSi, and WSi. In general, a melting point of these ceramic particles is 1500° C. or more, and the melting point of carbide, nitride, and boride particles is 2000° C. or more. These ceramic particles allow to use the heat insulator at high temperatures based on the heat resistance of the substrate. Among these, silicon carbide, silicon nitride, and silicon boride are preferable from the viewpoint of affinity to the silica cured product, and SiC is more preferable.

Such ceramic particles are held in the surface part of the substrate through the dispersion in the silica cured product or by attaching to the surface of silica-based inorganic fiber in the substrate, or being trapped in the space between the silica-based inorganic fibers of the substrate.

In order to stably fix and hold the ceramic particles in a surface part of the substrate with the silica cured product, the content of the ceramic particle as the infrared mediator is preferably from 1 to 20% by weight, more preferably 2 to 15% by weight, and even more preferably 3 to 10% by weight, based on the weight of the silica cured product corresponding to the solid content of colloidal silica. When the quantity of the ceramic particle is too small, the infrared absorption effect is not satisfactory. When the quantity of the ceramic particle is too large, the particles tends to form a flocculate, which may affect insulation due to the thermal conduction of the ceramics itself, as a result, the infrared absorption effect is lowered.

[Silica Cured Product]

A silica cured product which makes a role of fixing and holding an infrared mediator is an inorganic polymer containing $SiO_2$ or Si—O—Si bond (siloxane bond). According to an exemplary embodiment of the invention, the silica cured product may be a dry solidified product of film-formable fluid containing silica powder or a dry solidified product of a silica colloid solution such as colloidal silica.

Such a silica cured product has heat resistance almost similar to that of the silica-based inorganic fiber, and can stably hold the infrared mediator at high temperatures.

(1) Dry Solidified Product of Film-Formable Fluid Containing Silica Powder (Film-Forming Silica-Based Binder)

When a film-like infrared mediator such as metal foil is adopted, the silica cured product needs to act as a binder between the metal foil and the substrate. The film-formable fluid containing silica powder for a silica-based binder is a viscous liquid (suspension) or paste containing a film-forming component in a silica powder-dispersing fluid, or a mixture of water glass and this.

(1-1) Silica Powder-Dispersing Fluid

Examples of the silica powder include a pulverized product of crystalline silica (e.g. quartz powder, silica sand, silica stone, moringite, cristobalite), and amorphous silica (e.g. colloidal silica, precipitated silica, dry silica, fumed silica). A hydrous amorphous silica such as opal may also be used.

The silica may be synthetic silica or a mineral-containing silica.

Examples of dispersion medium of the fluid include water, water glass, organic solvents (e.g. lower alcohols such as isopropanol; esters such as ethyl acetate; ethers such as ethylene glycol monopropylether and propylene glycol monomethyl ether; ketones such as methyl ethyl ketone and methyl isobutyl ketone; cycloalkanes such as cyclohexanone; aromatic compounds such as toluene); and mixtures of water and a lower alcohol (e.g. methanol, ethanol, propanol, isopropanol); and a combination of them.

The water glass is a condensed aqueous solution having a high content of sodium silicate, and has a puddle-like viscosity. Although the water glass may be film-formable, the water glass may not be chosen for use at a temperature higher than 700° C. due to its relatively low melting point and softening point. Therefore, in the case of the metal foil-adhering type heat insulator used at a temperature above 700° C., a preferable heat insulator adopts a silica-based binder using a mixture of water and a lower alcohol as a dispersion medium.

In addition to the silica powder, the dispersion medium may contain a ceramic powder such as alumina powder within 30% or less, preferably 20% or less, more preferably 10% or less, and more preferably 5% or less of the solid content in the fluid. These content ranges do not affect the adhesiveness.

The solid content or the solid amount contained in the fluid is appropriately selected depending on either paste or suspension. In particular, when the binder is applied to a substrate by coating, applying, spraying or the like, the viscosity of the binder is appropriately adjusted for applying operation.

As the dispersion medium containing silica powder, a commercially available product as a heat-resistant inorganic adhesive may be used. Examples of the commercially available products include BETACK series (BETACK #160 CC, BETACK #900B, BETACK #900C, BETACK #1200, BETACK #1550B, BETACK #970, BETACK #1600S, BETACK #1800 LB, BETACK #003, BETACK #870, and BETACK #873) from Sakai Chemical Industry Co. Ltd., and so on.

(1-2) Film-Forming Component

A layered silicate is used as a film-forming component for imparting a film-forming property to the silica powder-dispersing fluid as described above. The silica powder-dispersing fluid, particularly a suspension or paste in which water is used as a dispersion medium, is dried and solidified to turn into silica powder flocculate. The silica powder flocculate is likely to collapse and fall off from the silica cured product upon impact, bending, abrasion, and the like. When water glass is used as a dispersion medium, the resulting glass is softened at a high temperature, and the force holding the silica powder may be lowered. On the other hand, the layered silicate can make a role of a film forming component which is capable of preventing the silica powder from falling off and scattering.

The layered silicate is also referred to as a phyllosilicate, in which a tetrahedron of $SiO_2$ is connected to each other to form a planar layered structure by sharing three oxygen atoms at the corners of the tetrahedron.

The metal constituting the silicate salt includes aluminum, potassium, sodium, calcium, and magnesium.

As the layered silicate, a sodium silicate represented by $xNa_2 \cdot ySiO_2$ (y/x=from 2 to 3) is preferable. Minerals such as smectites (e.g. saponite, hectorite, stevensite, and montmorillonite), permeances, or the like may be used, and smectites are preferably used.

A material containing a layered silicate may be used as a film-forming component. As the layered silicate, not only a synthesized layered silicate but also a mineral such as a smectite or a permeance, or bentonite primarily containing the mineral may be used.

Alternatively, a natural bentonite as well as a purified bentonite having an increased content of montmorillonite as a main component by removing impurities from the natural bentonite may be used. Further, a synthetic bentonite which contains sodium bentonite converted from calcium bentonite by ion exchange may be used. Bentonite is a generic term of clay containing montmorillonite as a main component.

Such a layered silicate is swollen by water absorption when dispersed in water. Further, the cation contained between layers of the layered silicate is hydrated with water molecule, thereby the layered silicate to divide into individual layers. A hydrated layer is formed on the surface of the resulting single layer to become viscous. As a result, a thickening effect is appeared. Further, the layered silicate is present in a state of aqueous dispersion (suspension), which acts like thixotropic fluid, thus, the viscosity of the suspension is high in the low shear region while the viscosity of the suspension is lowered in the high shear region.

The content of the film-forming component in the silica cured product is preferably 0.1-5% by weight, preferably 0.5-4% by weight, and more preferably 1-3% by weight.

The amount of the above range is sufficient for the film-forming component to make its role. Unduly high content causes the viscosity of the suspension extremely high, which limits to a coating method or the like for applying the dispersion to the substrate. So the workability tends to be deteriorated.

The film-forming silica-based binder having the above-described composition is a viscous and thixotropic fluid (suspension, viscous liquid, or paste). When the binder is solidified, the layered silicate is solidified with a stable card structure. When the silica powder dispersion as a main component of the silica-based binder is dried and solidified, the layered silicate is filled between the aggregates of silica particles. It is considered that the silica particles are stably held in the solidified layers, to prevent the silica particles from scattering.

Thus film-forming silica-based binder is dried and solidified to turn into a silica cured product in which the silica powder disperses in a film-forming component as a matrix. The silica powder dispersed in the film-forming component can act for a binder through which the metal foil is bonded to the silica-based inorganic fiber. When water glass is contained, the metal foil can be bonded to the silica-based inorganic fiber of the substrate in the process of vitrification (solidification).

(2) Colloidal Solution (Colloidal Silica) in Which Particles of Anhydrous Silicic Acid are Dispersed Colloidal silica is a colloidal solution in which aggregate of silicon dioxide ($SiO_2$) containing an OH group formed by hydration on its surface is dispersed in an aqueous dispersion medium in a form of colloidal particle.

Water and/or an organic solvent are used as the dispersion medium. Example of the organic solvent include lower alcohols such as isopropanol; esters such as ethyl acetate; ethers such as ethylene glycol monopropylether and propylene glycol monomethyl ether; ketones such as methyl ethyl ketone and methyl isobutyl ketone; cycloalkanes such as cyclohexanone; aromatic compounds such as toluene. A mixture of water and a lower alcohol (e.g. methanol, ethanol, propanol, isopropanol) may be used. Among them, an aqueous dispersion medium such as water, or a mixture of water and a lower alcohol are preferably used from the viewpoint of working environment.

The colloidal particles are stably dispersed in aqueous dispersion medium because SiOH groups and OH-ions present on the surface of the amorphous silicon dioxide particles can be stabilized due to coexistence of alkali ions such as Na ion.

In such a colloidal particle as a dispersoid, a siloxane bond is newly formed from the SiOH groups, when the dispersion medium is evaporated by heating. And then the colloidal particles are integrated or fused on the surface of the colloidal particles, thereby acting as a binder between silica-based inorganic fibers in the substrate.

The content of silicon dioxide in the colloidal solution, or solid content of the colloidal solution, is from about 5 to 60% by weight, preferably 5 to 50% by weight, and more preferably 10 to 40% by weight. In the case of spray method, a colloidal solution having a viscosity of 300 mPa·s or less is preferred from the viewpoint of working efficiency.

The lower the content of silicon dioxide (solid content), the more increased amount of coating for assuring the necessary amount of silicon dioxide for keeping the shape of the molded body. A larger amount of coating requires a larger energy for evaporation of water contained in the dispersion medium when heat molding. Also, a longer period for heating is disadvantageous in productivity improvement. On the other hand, an insufficient amount of coating may result in a molded body having unsatisfactory strength.

If the content of silicon dioxide (solid content) is too high, the silicon dioxide powder remaining on the surface of the molded body tends to increase. The remained silicon dioxide powder becomes dust and lowers handling property. In addition, stability of colloidal particles as a dispersoid is lowered to be gelled easily in a state of suspension or dispersion before molding. For these reasons, the colloidal solution having too high content of silicon dioxide is used by coating or applying method instead of spraying, although they are poor in application workability. Moreover, the colloidal solution having unduly high solid content tends to be hard for silicon dioxide to intrude into the substrate and exhibit excellent binder function for keeping an imparted shape.

The size (average particle diameter) of the colloidal particles is not particularly limited, but is normally from 1 to 200 nm, preferably 2 to 100 nm, more preferably 3 to 50 nm, still more preferably 4 to 25 nm, and particularly preferably 4 to 18 nm. The increase of the particle size decreases the number of particles when the content is the same, therefore the strength of the resulting molded insulator tends to be lowered. Further, shape retention property of the molded insulator tends to be deteriorated.

The average particle size as used herein is an average of primary colloidal particle, and can be obtained in terms of sphere equivalent diameter by dynamic light scattering method, shearing method, BET method, laser diffraction scattering method, or the like. The measuring method may be appropriately selected depending on the size of the colloidal silica. For example, particles of several tens nm or less are preferably used by a BET method or a laser diffraction scattering method. The particle size measurement by the dynamic light scattering method may be performed using a commercially available p article size distribution measuring apparatus. The shearing method is disclosed in Analytical Chemistry, vol. 28, pp 1981-1983 (1956), and is common in an analysis technique applied to the measurement of the average particle size of colloidal silica.

The colloidal particles may exist in a form of individually dispersed spherical particle or in a form of chain-like or beads-like aggregate which is formed by association of particles.

The chain- or beads-like aggregate may be a secondary particle extending in one direction like chain, or may form an extended secondary particle by bonding through condensation between their silanol groups. The extension form may be linear, branched, or partial mesh.

Such chain-like, thread-like, or beads-like aggregate has an average diameter (secondary particle diameter) falling in the above-mentioned range of the particle average diameter when the aggregate is assumed as a sphere. Such a secondary particle size can be measured by a dynamic light scattering method. The average particle diameter of the colloidal primary particles (spherical particles) constituting the secondary particle is preferably from 4 to 18 nm.

The aggregate or associated particles as the colloidal particle is likely to provide a rigid film, which is advantageous in retention of the three-dimensional shape imparted by molding. On the other hand, in the case where the average particle diameter is increased or a chain-like or beads-like aggregate is formed, a larger particle or the chain- or beads-like aggregate does not tend to intrude into the substrate and remains on the surface layer of it. This means that the rate of the particles or aggregates remaining on the surface of the molded insulator tends to increase. They turn into powder by heat setting and cause a problem associated with dust. From the viewpoint of handling ability, a preferable colloidal solution is a solution in which a sphere particle having a smaller particle size is dispersed individually as a dispersoid.

An unduly large colloidal particle as the dispersoid is difficult to impregnate into the flat substrate of the inorganic fibers, which may lower the function of the binder for shape retention. From this viewpoint, a preferable average particle diameter (primary particle diameter) of the colloidal silica is relatively small.

The stability of the colloidal particles is generally susceptible to pH of the colloidal solution. For preventing gelation, the colloidal solution is preferable to be stabilized with an alkali, specifically, Na ion. The liquid property (pH) of the silica colloid solution is related to the stabilization of the colloidal particles. When stabilized with Na ions, the dispersion is normally alkaline having pH of 8 to 11. Also, the neutral or acidic dispersion having pH of 4 to 7, which may be attained by reducing the quantity of strong alkali ions for stabilizing the colloidal p articles, may be employed.

The specific gravity at 20° C. of the colloidal solution is usually dependent on the silica content. When the silica content is adjusted to the above-mentioned range, the specific gravity falls in the range of 1.10 to 1.40, and preferably about 1.12 to 1.25.

Further, a preferable viscosity at 25° C. is 300 mPa·s or less, more preferable viscosity is 100 mPa·s or less.

In general, a colloidal solution having a higher viscosity is likely to be gelled, and is difficult to apply to the substrate by a spray method as described later. A preferable viscosity is 80 mPa·s or less, further 60 mPa·s or less from the viewpoint of workability and productivity.

The colloidal silica or a colloidal solution of silicon dioxide used in the invention may contain a slight amount (about 500 to about 300 ppm) of a divalent metal such as calcium, magnesium, Sr, Ba, Zn, Pb, Cu, Fe, Ni, Co, Mn, and/or a trtivalent metal such as Al, Fe, Cr, Ti, and Y in a silica sol derived from the material used in the production of the colloidal silica.

Embodiment of High Temperature-Heat Insulator

According to the invention, the high temperature-heat insulator comprising a substrate, an infrared mediator and a silica cured product include the embodiments below:
(I) a metal foil-adhering type heat insulator which adopts a reflection type infrared mediator such as metal foil;
(II) a particle dispersion type heat insulator which adopts an absorption type infrared mediator such as ceramic particle; and
(III) a combination type heat insulator which adopts both of a reflecting type infrared mediator and an absorption type infrared mediator.

These heat insulators and a method for manufacturing a respective three-dimensionally shaped article will be described below.

<Particle Dispersion Type Heat Insulator and Method for Manufacturing a Three-Dimensionally Shaped Article>

In the particle dispersion type heat insulator, a silica cured product is present in a state of adhesion to the surface of the fiber constituting the substrate, or being embedded in a space between the fibers, or crosslinking between the fibers in the substrates. Thereby, the ceramic particles may be held in a space between fibers or in the silica cured product.

The molded insulator having a three-dimensional shape can be produced by the following manufacturing method.

The method for manufacturing a particle dispersion type heat insulator having a three-dimensional shape comprises a step of coating, applying, spraying or impregnating a silica colloid solution containing an absorption type infrared mediator (ceramic powder) on one surface of a flat substrate of silica-based inorganic fibers; and a step of heating and compressing the flat substrate to form a surface into a recessed part of the three-dimensionally shaped insulator.

Each step will be described below with reference to FIG. 1

(1) Application Step of Silica Colloid Solution Containing Ceramic Particles

The application step is carried out by coating, applying, spraying or impregnating a silica colloid solution containing ceramic powder as a particulate infrared mediator on one surface of a flat substrate 1 which is fibrous board of silica-based fibers. The selection from coating, applying, spraying or impregnating is done according to the viscosity and the solid content of the silica colloid solution.

The application may be carried out by brushing; a roll coater method using doctor blade, gravure coater, or the like; screen printing using a squeegee; spray coating using an air spray gun, airless hand spray, pressure-feed type automatic air spray or the like; and contact method soaking the one surface in the silica colloid solution.

Of these, the spray coating is preferred in workability and productivity. For example, FIG. 1(a) shows a method of spraying the colloid solution 2 from the upper side of a flat substrate 1 comprising of bulk of silica-based inorganic fibers 1a. FIG. 1(b) shows a state in which the silica colloid solution containing the particulate infrared mediator 2a is coated on one surface of the flat substrate 1.

The amount of the silica colloid solution to be coated is appropriately determined according to the solid content of the solution. Accordingly, the amount of coating is from 100 to 600 g/m², preferably from 100 to 400 g/m², more preferably from 100 to 300 g/m² in terms of solid content per coated area of the substrate.

If the amount (solid content) is too large, the silica colloid particles or the ceramic particles are hardly impregnated into the molded insulator, so that a silica layer is likely to be formed on one surface (coated surface) of the molded insulator. Thus resulting rigid silica layer is poor in flexibility and cushioning property compared to the substrate of inorganic fibers, as a result, mounting workability of the obtained heat insulator is lowered. Moreover, the ceramic particles as the infrared mediator cannot be stably held. Even when relatively small colloidal silica particle which is apt to intrude into the fibrous board is used, an unduly large amount of coating increases the quantity of silica powder remained on the surface of the substrate in the molded insulator. As a result, handling property and workability is lowered due to powdery dust.

The silica colloid solution having unduly low concentration (solid content) increases its amount of coating for assuring a desired solid amount. The increase in the amount prolongs time period for drying as well as heating for curing, which results in lowering the productivity. Reducing the amount of coating for productivity reduces the amount of silica served as a binder. Therefore, the retention of the imparted three-dimensional shape would be difficult.

(2) Heating and Compressing Step

A step of heating and compressing a colloidal silica-coated substrate is typically carried out by setting the substrate in a mold heated to a certain temperature. The substrate is preferably set in a state where the silica colloid solution-coated surface is positioned at a concave side of the resulting three-dimensional shape.

For example, when a pair of molds, i.e. male mold 5 and female mold 6 are used as shown in FIG. 1(b), a convex of the male mold 5 and the colloidal silica 2a coated surface are set to become face-to-face. The substrate is pressed against the female mold 6 with heating through the male mold 5, a resulting insulator 7 has a configuration fitting to the concave of the female mold 6 (FIG. 1(c)).

The pressure force in the compressing step is a pressure to reduce the thickness of the substrate by below 50%, preferably the range of 5 to 45%, and more preferably range of 10 to 40%. The reduction rate corresponds to a ratio of the thickness reduction ($T_1$-$T_2$) to the original thickness of the substrate ($T_1$) which is 100% (see FIG. 1(a)), wherein $T_2$ represents the thickness after compression (see FIG. 1(c)).

The larger reduction in thickness means a larger compression rate of the substrate in the compressing step. If the compression ratio is too large, the inorganic fiber constituting the substrate is apt to recover the original thickness due to its resilience, and the imparted shape may not be retained. Additionally, a thicker insulator is superior in heat insulating performance. On the other hand, when the thickness reduction rate is too low or the compression rate is too small, the ratio of immobilized fibers is lowered because the silica colloid particles cannot be impregnated deeply into the substrate and the imparted shape may not be retained.

The heating temperature is from 100 to 500° C., preferably from 150 to 500° C., and more preferably from 150 to 400° C.

The heating temperature is a temperature necessary for the dispersion medium (typically water) of silicon dioxide colloidal solution to evaporate in a short time period, and may be appropriately determined depending on the heating time period. The heating time period can be shortened by selecting a higher temperature for heating. When the selected heating temperature is 600° C. or higher, the hydroxyl groups of the colloidal silica can react to form siloxane bonds. On the other hand, when silica-based inorganic fiber containing a hydroxyl group, which is constituent of the fibrous board as the substrate, is heated up to 500° C. or more, the silica-based inorganic fiber is hardened. The hardened silica fiber stimulates physical skin of a person who handles the silica-based inorganic fiber, and makes him feel itchy. This causes poor workability and handling property. Therefore, a temperature below 500° C. is preferable for the heating temperature.

An appropriate pressure and an appropriate heating time period depend on the form and average particle size of the colloidal particle, silica content in the colloidal solution, amount of coating, viscosity of the colloidal solution, and the like.

In the case of using the silica colloid solution under the above-mentioned conditions, the silica colloid solution can be cured by heating within 5 minutes, further within 3 minutes, yet further within 1 minute. When heating and curing is insufficient, the imparted shape cannot be retained due to resilience restoring force of the fiber. On the other hand, heating and compressing for more than 5 minutes is not preferred from the viewpoint of productivity.

Shapes to be imparted on the insulator includes a tray, hemisphere, pipe, semicircle in cross section, frustum, and the like. Besides them, another shape may be adopted.

As shown in FIG. 1, a compression molding method using a press plate corresponding to a male mold 5 is typically performed. A press and vacuum molding method and vacuum molding method are also adopted. The press and vacuum molding is carried out by clamping a flat board between the female mold and the heated press plate, blowing air from the mold side to bring the flat board into contact with the heated press plate, thereby softening the flat board, and then stopping the blow-in of the air, followed by blowing compressed air from the press plate to press the board against the concave of the female mold. The vacuum molding is carried out by clamping the flat board to a frame suspended above the mold, heating and softening the flat board, and then making vacuum state between the flat board and the mold, thereby bringing the flat board into close contact with the mold, followed by cooling down to impart a three-dimensional shape.

In any method, it is preferable to press a colloidal silica-coated surface by the convex of the mold so that the coated surface become a concave part of the molded body, which is a smaller stretch rate in a molded body having a configuration with concave and convex.

In the case of manufacturing a flat heat insulator, pressurizing with a mold for shaping is not necessary. A heating and compressing step can be replaced with solidification by drying the silica colloidal solution. However, heating is preferably conducted in order to shorten the time period for drying and solidifying. Also pressurizing is preferably conducted for stably holding the infrared mediator.

The particle dispersion type heat insulator and the three-dimensionally shaped insulator are used so that the infrared mediator-held surface is placed on the thermal source side. The infrared mediator absorbs thermal energy (infrared rays, especially near-infrared rays) from the thermal source and radiates it in the vicinity of the thermal source, thereby the consumption of the thermal energy of the thermal source can be suppressed.

<Metal Foil-Adhering Type Heat Insulator and Method for Manufacturing a Three-Dimensionally Shaped Insulator Article>

FIG. 2 is a diagram showing a configuration of one embodiment of the metal foil-adhering type heat insulator according to the invention. A metal foil 4 is adhered to one surface (FIG. 2(a)) or both surfaces (FIG. 2(b)) of the substrate 1 through a silica cured product layer 3. The substrate 1 is a bulk of silica-based inorganic fibers containing hydroxyl groups.

In the metal foil-adhering type heat insulator, the metal foil 4 is adhered to the exterior surface of the insulator. Therefore, leakage of infrared rays to the surroundings may be suppressed thanks to the reflection by the metal foil 4 and excellent heat insulating performance may be exhibited. In addition, covering the exterior surface with metal foil can improve the handling property. In the case of the substrate alone, there are problems: the fibers are readily broken when mounting the substrate to a device; and powdery dust such as shots derived from the substrate scatters. However, covering the substrate's surface with the metal foil can prevent scattering of the dust. Moreover, when the metal foil is positioned on the external side of the heat insulator, the metal foil can also prevent adhesion or intrusion of foreign matters such as dust and sand from the outside to the insulator.

A surface to be adhered should be selected according to the characteristic such as melting point of the metal foil and the usage of the heat insulator. For example, in the case of using aluminum foil (melting point of 660° C.), the metal foil-adhered surface should be positioned on the external side of the insulator (opposite side to the thermal source) because the aluminum foil will be burnt off by exposure to a thermal source of 600° C. or more for a long time period.

If the temperature of the thermal source is equal to or lower than the melting point of the metal foil, the metal foil-adhered surface can be positioned on the thermal source side.

Such a metal foil-adhering type heat insulator may be manufactured by a method shown in FIG. 3. The method comprises a step of coating, applying, spraying or impregnating film-forming silica-based inorganic binder on at least one surface of a flat substrate of silica-based inorganic fibers containing hydroxyl group (FIG. 3(a)); a step of attaching a metal foil 4 to a binder-coated surface (FIG. 3(b)); and a step of drying and solidifying the binder.

A metal foil-adhering type heat insulator having a plate- or sheet-like shape can be produced by steps of applying binder, attaching a metal foil, and drying and solidifying the binder. In the case of manufacturing a metal foil-adhering type heat insulator having a three-dimensional shape, the three-dimensional shape is imparted by pressing with a mold and solidifying the binder (FIG. 3(c)).

In other words, the metal foil-adhering type heat insulator having a three-dimensional shape is formed by a method similar to a method for manufacturing a particle dispersion type heat insulator. The method comprises a step of coating, applying, spraying, or impregnating a film-forming silica-based binder 3' to one surface of the flat substrate 1; a step of attaching a metal foil 4 to the binder-coated surface; and a step of heating and compressing the flat substrate with molds 5' and 6' for imparting a shape.

As is similar to the particle dispersion type heat insulator, examples of the three-dimensional shape include tray, hemisphere, pipe, semicircle in cross section, frustum, and the like.

Each step will be described below.

(1) Binder Application Step

The application step is carried out by applying, coating, or spraying the above-mentioned film-forming silica-based binder (a silica powder-dispersing fluid (suspension) or paste containing a layered silicate) 3' to one side or both sides of a flat substrate 1 as a fibrous board. The selection from the application techniques is appropriately done according to the viscosity and the solid content of the film-forming silica-based binder to be used.

A method for applying, coating, or spraying may be similar to that of the particle dispersion type heat insulating material. Spraying is preferably adopted for workability and productivity. The film-forming silica-based binder may be suitably diluted with water for spraying.

The amount of the binder to be coated is appropriately determined according to the solid content of the binder. Accordingly, the amount ranges from 100 to 600 g/m², preferably from 100 to 400 g/m², more preferably 100 to 300 g)/m², in terms of solid content per coated area of the substrate.

The binder cured product (silica cured product) has a higher thermal conductivity than the substrate. Therefore, if the amount (solid content) is too large, heat conduction of the silica cured product tends to lower the heat insulating performance. On the other hand, if the amount is too small, the metal foil is insufficiently adhered to the substrate.

(2) Metal Foil-Adhering Step

A metal foil 4 is attached to the binder-coated surface of the substrate. In the case of pressing with a mold and solidifying a binder, a metal foil may be placed on a surface of the mold instead of the binder-coated surface. In this case, the metal foil is pressed against the binder-coated surface of the substrate to attach the metal foil to the substrate through the binder.

(3) Heating and Compressing Step

In the case of manufacturing a metal foil-adhering type heat insulator having a three-dimensional shape, the metal foil-attached surface is heated and pressed with the molds 5' and 6' (FIG. 3(c)). For example, the mold is heated to a certain temperature and pressed against the metal foil-attached substrate at a certain pressure. The binder is dried and solidified in the heating and compressing step.

The pressure force and time period for heating and compressing for imparting a three-dimensional shape is similar to those in the case of manufacturing a particle dispersion type heat insulator. Accordingly, the pressure is such a force to reduce the thickness of the substrate by less than 40%, preferably between 5 and 35%, and more preferably between 10 and 30%, based on the original thickness (100%). This reduction rate is correspondence to a reduction amount $(T_1-T_2)$ wherein $T_1$ represents for an original thickness of the substrate (FIG. 3(a)) and $T_2$ represents for the thickness of a resulting molded article (FIG. 3(d)).

A heating temperature and heating time period are appropriately determined according to the kind and amount of the binder. The applied pressure, especially the pressurizing speed, is selected with taking into consideration the ductility of the metal foil because the ductility is relevant to its molding followability.

Heating can shorten the time period for drying and solidifying, which is preferable. On the other hand, rapid heating at a high temperature may create a porous cured product due to rapid evaporation of the dispersion medium, resulting in lowering adhesive strength. The determination with respect to heating temperature, heating time period, and whether heating or non-heating may be appropriately done according to productivity and application of the metal foil-adhering type heat insulator.

In the case of FIG. 3, the metal foil 4 attached surface of the substrate is pressed by the male mold 5'. In the case that the metal foil becomes the exterior surface of the hemispherical molded product, a male mold presses against the surface to which the metal foil is not attached. In this case, when the substrate is placed on the top of the female mold 6', the surface without metal foil faces to the male mold instead of the positioning shown in FIG. 3(c).

<A Combination Type Heat Insulator>

A combination type heat insulator is a heat insulator in which a metal foil is adhered on one surface and an absorption type infrared mediator such as ceramic particle is held on the other surface of the substrate.

Such a combination type heat insulator is set so that the absorption type infrared mediator-held surface is closer to the thermal source. In the combination type heat insulator, metal foil can prevent leakage of infrared rays and reflect the thermal energy toward the thermal source, while the ceramic particles can absorb the thermal energy from the thermal source and emit it in the vicinity of the thermal source. Thus, the consumption of thermal energy can be suppressed. Accordingly, the combination type heat insulator is useful as a heat insulator for insulation of a thermal source at high temperatures.

<Three-Dimensionally Shaped Insulator>

Thus manufactured heat insulator having a three-dimensional shape can stably retain the three-dimensional shape thanks to the silica cured product. That is, although the silica fiber substrate is difficult to stably retain the shape due to resilience restoring of the fibers, the solidified binder or silica cured product can suppress the spring back because the silica cured product is not deformable. Therefore, the fiber constituting the substrate is not needed to be fused at a high temperature in the manufacturing method of the invention.

Both types of molded heat insulators (i.e. metal foil-adhering type heat insulator and particle dispersion type heat insulator) have a thickness of usually 3 to 20 mm, and more preferably 4 to 15 mm, although it depends on the original thickness of the flat substrate (fibrous board). A heat insulator having such a thickness can assure a heat insulating performance required in lightweight applications.

The density of the molded heat insulator is 100-300 kg/m³, more preferably 130-270 kg/m³. A low density means that the quantity of fibers contained in the molded heat insulator is low, which tends to lower heat insulating performance. On the other hand, a high density means that the fibrous substrate is excessively compressed. Compression above 300 kg/m$^3$ introduces the resilience restoring of the fibers, which lowers the retention of the shaped heat insulator.

The high temperature-heat insulator of the invention may be used not only as a heat insulator but also as an acoustic absorber or a shock absorber used at high temperatures, according to the thickness, density, and kind of fibers constituting the substrate. This is because the heat insulator may exhibit a damping effect through gaps between entangled fibers in the substrate.

The heat insulator of the invention is resistant to 600° C. or more and further 800-1000° C. The heat insulator is excellent in heat insulating property at high temperatures and can absorb and damp noise or vibration. Therefore, the heat insulator may be useful for an acoustic absorber mounted on exhaust portion in an automotive, especially mounted near manifold. Such application of the heat insulator may suppress a temperature drop when stopping the engine, and improve the reaction efficiency of the catalytic converter used at a high temperature, as well as improve the engine efficiency. Also, improvement of fuel efficiency of a device operating at high temperatures such as a fuel cell may be expected by use of the heat insulator. A conventional heat insulating sheet has to wrap around a device for insulation, however, workability in mounting operation may be reduced by using a three dimensionally shaped heat insulator having a recessed portion which fits to the mounting portion of the device.

EXAMPLES

[Comparison of High Temperature-Heat Insulators in Heat Insulating Performance]
1. Elements of High Temperature-Heat Insulator
(1) Substrate A needle-punched mat which is a fibrous mat (length: 300 mm, width: 300 mm, thickness: 6 mm) produced by needle-punching a bulk of BELCOTEX® 110 from BELCHEM GmbH (composition: $AlO_{1.5} \cdot 18[(SiO_2)_{0.6}(SiO_{1.5}OH)_{0.4}]$, fiber diameter: 9 μm, average fiber length: about 90 mm) was used.
(2) Infrared Mediator
(2-1) Reflection Type Infrared Mediator Aluminum foil having a thickness of 25 μm, "my foil" (trade name) from UACJ Co. Ltd., was used.
(2-2) Absorption Type Infrared Mediator SiC powder (Nippon Keical Limited), which had a particle size distribution $D_{50}$ of 1.8 μm and $D_{90}$ of 6.8 μm as measured by light scattering method, was used. The emissivity of the SiC powder is about 0.82.
(3) Raw Materials for Silica Cured Product
(3-1) Film-Forming Silica-Based Binder As the silica powder-dispersing fluid, heat-resistant inorganic adhesive available from Sakai Chemical Corporation, which is an alkaline viscous paste (crystalline silica of about 50%, sodium silicate of about 20%, viscosity of 20 to 50 Pa·s), was used. This heat-resistant inorganic adhesive was diluted with water (1:1 in weight ratio). Subsequently, as a film-forming component, "Sumecton SA"™ (synthetic clay classified into smectite) from Kunimine Industries Co. Ltd. was added and stirred homogenously to prepare a film-forming silica-based binder having a concentration of 2 wt % of the "Sumecton SA"™.

(3-2) Colloidal Silica (Silica Colloid Solution)

As a binder, "Snowtex XS"™ from Nissan Chemical Corporation was used. "Snowtex XS"™ is a neutral colloidal solution in which silica spherical particles having average particle diameter of 4 to 7 μm are dispersed in aqueous dispersion medium (containing Na ion), and having 20% in $SiO_2$ content.
2. Production of High Temperature-Heat Insulator (1) Metal Foil-Adhering Type Heat Insulator (Nos. 1 and 2)

The film-forming silica-based binder prepared above was sprayed on one surface of the above-mentioned needle-punched mat as a substrate with an automatic gun. The amount of the film-forming silica-based binder sprayed on the surface was 333 g/m$^2$.

An aluminum foil (thickness: 25 μm) was placed on a binder-coated surface and a press plate heated at 300° C. was pressed against for 1 minute. The pressure reduced the thickness of the mat by 35%, which is correspondence to 65% of the final thickness ($T_2$) of the mat, if the mat's original thickness ($T_1$) is 100%. The substrate was pressed for 1 minute, and then the press plate was released. Thus, a metal foil-adhering type heat insulator Nos. 1 and 2 in which a metal foil is adhered on the one surface was prepared.

The heat insulating performance of the prepared heat insulator was evaluated in accordance with a method described later. The results are shown in Table 1.
(2) Particle Dispersion Type Heat Insulator (Nos. 3 Through 5)

An absorption type infrared mediator, SiC powder, was added to colloidal silica to prepare SiC-containing silica colloid solution in such a manner that the solid content was 5% by weight, 10% by weight, or 15% by weight based on the weight of SiC-containing silica colloid solution.

The prepared three SiC-containing silica colloid solutions each was sprayed on one surface of a needle-punched mat (substrate) using an automatic gun. The amount of the SiC-containing silica colloid solution sprayed on the surface was 333 g/m$^2$. The same amount was sprayed despite of differing in silica content of the SiC-containing silica colloid solution.

After spraying the binder, a press plate heated at 300° C. was pressed against the substrate to reduce the thickness of the mat by 35%, which is correspondence to 65% in the thickness ($T_2$) of the compressed mat relative to the original thickness ($T_1$) which is 100%. This compression state was kept for 1 minute, and thereafter, the press plate was released to prepare a particle dispersion type heat insulator No. 3-5 in which the infrared mediator was held on the one surface.

The heat insulating performance of thus prepared heat insulator was evaluated in accordance with a method described later. The results are shown in Table 1.
(3) Combination Type Heat Insulator Comprising Metal Foil and Ceramic Powder (Nos. 6 Through 8)

The SiC-containing silica colloid solution prepared above was sprayed on one surface of a needle-punched mat as a substrate using an automatic gun. The amount of the SiC-containing silica colloid solution sprayed on the surface was 333 g/m$^2$. The same amount was sprayed despite of differing in silica content of the silica colloid solution. A film-forming silica-based binder was sprayed on the other surface of the substrate using an automatic gun, and then an aluminum foil was adhered to the binder-coated surface.

In such a state, a press plate heated at 300° C. was applied in the same manner as No. 1. SiC was held on the one surface, and a metal foil was adhered on the other surface of the substrate, and thereby combination type heat insulators Nos. 6-8 were prepared.

The heat insulating performance of thus prepared heat insulators were evaluated in accordance with a method described later. The results are shown in Table 1.

(4) Reference Examples 1 and 2

A substrate alone was compressed in the same manner as No. 1 to prepare a heat insulator, which was Reference example 1.

A substrate was sprayed with the sole colloidal silica (i.e. silica colloid solution without SiC) and compressed in the same manner as No. 3 to prepare a heat insulator, which was Reference example 2.

The heat insulating performance of thus prepared heat insulators were also measured and evaluated. The results are shown in Table 1.

3. Evaluation of Heat Insulating Performance

The heat insulating performance of the prepared high temperature-heat insulators Nos. 1 to 8 and the reference examples 1 and 2 were evaluated with the measuring apparatus shown in FIG. 4

A furnace 10 had an opening 10a with a diameter of 100 mm at the center of its top surface, and a heater 11 was set in the furnace 10. A prepared heat insulator 13 was placed on the top surface including the opening 10a. The infrared mediator contained in the heat insulator 13 was positioned on the thermal source side (furnace side) or the external side, as shown in Table 1. A metal (SUS304) plate 14 (150 mm in length, 150 mm in width and 1.5 mm in thickness) as a load was placed on the upper surface (external side) of the heat insulator 13. The metal plate 14 was coated with black body-spray (emissivity of 0.94) available from Ichinen TASCO Co. Ltd.

The inside of the furnace 10 was heated by the heater 11 whose temperature was controlled at 600° C. or 900° C. with a thermocouple 12. After reaching the intended heating temperature, it was allowed to stand for 30 minutes, and the surface temperature on the metal plate 14 was measured with a thermocamera (FLIR 640 T). The measurement results are shown in Table 1.

TABLE 1

| No | surface conditions thermal source side | external side | furnace temperature (° C.) 600 | 900 |
|---|---|---|---|---|
| Reference example 1 | — | — | 176 | 303 |
| Reference example 2 | Colloidal silica-coated | — | 190 | 303 |
| 1 | Aluminum foil-adhered | — | 142 | — |
| 2 | — | Aluminum foil-adhered | 209 | 263 |
| 3 | SiC-coated (5 wt %) | — | 188 | 286 |
| 4 | SiC-coated (10 wt %) | — | 188 | 288 |
| 5 | SiC-coated (15 wt %) | — | 192 | 293 |
| 6 | SiC-coated (5 wt %) | Aluminum foil-adhered | 216 | 274 |
| 7 | SiC-coated (10 wt %) | Aluminum foil-adhered | 212 | 270 |

TABLE 1-continued

| No | surface conditions thermal source side | external side | furnace temperature (° C.) 600 | 900 |
|---|---|---|---|---|
| 8 | SiC-coated (15 wt %) | Aluminum foil-adhered | 215 | 269 |

As for the heat insulator No. 1, the surface temperature when heated at 900° C. could not be measured because the aluminum foil was burnt off.

As for the heat insulators Nos. 2 to 8, the heat insulating effect was not recognized as compared with the substrate alone (reference example 1) when heated at 600° C. However, the heat insulating effect of heat insulator Nos. 2 to 8 each was recognized as compared with the substrate alone when heated at 900° C.

By comparison of Nos. 3-5 with Nos. 6-8, it is understood that combination of the absorption type infrared mediator and the reflection type infrared mediator can provide a higher heat insulation effect than the case of sole use of the absorption type infrared mediator.

In the case of insulation for a thermal source having a higher temperature, the positioning of the absorption type infrared mediator on the thermal source side and the reflection type infrared mediator on the external side could provide an enhanced heat insulation effect.

[Relationship Between Silica Colloid Particles and Three-Dimensional Shape Moldability]

1. Elements of High Temperature-Heat Insulator (1) Substrate

A needle-punched mat (size: 300 mm length, 300 mm width, 6 mm thickness), "isoTHERM"® BCT from Frenzelit GmbH was used.

The needle-punched mat was a fiber mat with a thickness of nominally 6 mm produced by needle-punching a bulk of BELCOTEX® 110 from BELCHEM GmbH (composition: $AlO_{1.5} \cdot 18[(SiO_2)_{0.6}(SiO_{1.5}OH)_{0.4}]$, fiber diameter: 9 μm).

(2) Colloidal Silica

The used colloidal silica had an average particle size and shape as indicated in Table 2. All colloidal silica in Table 2 are Na type SNOWTEX® from Nissan Chemical Corporation, which is a suspension in which colloidal particles are stabilized with Na ion.

The chain-like aggregate in Table 2 was an aggregate of silica particles (primary particle diameter of 9 to 15 nm) gathering in a form of thread. The beads-like aggregate was an aggregate of silica particles (primary particle diameter of 18 to 25 nm). Their average particle sizes indicated in Table 2 was correspondence to a particle size of the secondary colloidal particle measured by the dynamic light scattering method.

2. Production of a Heat Insulator Having a Three-Dimensional Shape Nos. 11 Through 17

The colloidal silica indicated in Table 2 was sprayed on one surface of the needle-punched mat. The amount of the colloidal silica was 666 g per meter square of sprayed surface. This amount of coating was correspondence to the solid content of 133-320 g/m².

Next, as shown in FIG. 1(b), the colloidal silica-coated substrate 1 was placed on the female mold 6 heated at 300° C. The colloidal silica-coated surface was positioned on the upper side of the substrate and pressed for one minute with the male mold 5 heated at 300° C. The pressure applied to the substrate reduced its thickness by 35%, which was correspondence to 65% of the thickness ($T_2$) after compression if the original thickness ($T_1$) before compression is 100%. The pressurized state was kept for 1 minute, and then the male mold (press plate) 5 was released to prepare a tray-shaped insulator 7 as shown in FIG. 1(c). The distance (d1) between the sidewalls of the insulator 7 immediately after molding was 150 mm, and the inclination angle α of the sidewall was 70°. The inclination angle α is an angle of the sidewall to the horizon.

The shape retention property and the handling property of the tray-shaped insulator was evaluated in accordance with methods described later. The results are also shown in Table 2.

Reference Examples 11 and 12

Reference Examples 11 and 12 were formed into a tray without colloidal silica. That is, the substrate alone was compressed and heated at 300° C. for one minute (Reference example 11) or 5 minutes (Reference example 12). The thickness of the substrate was reduced by 35% based on the original thickness of 100%, which is correspondence to 65% in the thickness after compression.

No problem (Δ): the displacement distance per 10 g ranges from 2 mm to 3 mm

Bad (×): the displacement distance per 10 g is more than 3 mm (2) Handling Property The colloidal silica coated-surface of a produced insulator was visually observed and the quantity of powder as a cause of dust was examined on the basis of visual observation. Further, the degree of adhered powder were examined by touching the colloidal silica-coated surface and thereafter observing the hand.

If a relatively large quantity of powder was observed and the powder adhered to the hand is conspicuous level, the evaluation result was represented as "Δ". If the powder was observed but the quantity of powder adhered to the hand was not problematic, the evaluation result was represented as "○". In the case of no powder, the evaluation result was represented as "◎".

TABLE 2

| | | No | | | | | | | Reference example 11 | Reference example 12 |
|---|---|---|---|---|---|---|---|---|---|---|
| | | 11 | 12 | 13 | 14 | 15 | 16 | 17 | | |
| Silica colloid solution | Silica particle | individual dispersion of spherical particles | individual dispersion of spherical particles | individual dispersion of spherical particles | individual dispersion of spherical particles | individual dispersion of spherical particles | chain-like aggregate | beads-like aggregate | binderless | binderless |
| | average particle size (nm) | 4-6 | 10-15 | 10-15 | 20-25 | 20-25 | 40-100 | 80-120 | — | — |
| | solid content (%) | 20 | 20 | 30 | 48 | 24 | 20 | 20 | — | — |
| Heating and compressing time (min) | | 1 min. | 1 min. | 1 min. | 1 min. | 1 min. | 1 min. | 1 min. | 1 min. | 5 min. |
| Evaluation | shape retention property | ○ | Δ~○ | Δ~○ | Δ~○ | Δ | ◎ | ○ | X | Δ |
| | handling property | ○ | ○ | ○ | X | ○ | Δ | Δ | — | ◎ |

The shape retention property and the handling property of the prepared tray-shaped insulators were evaluated. The results are also shown in Table 2.

3. Evaluation Method and Result
(1) Shape Retention Property

As shown in FIG. 5, the bottom face of the tray-shaped insulator 20 was fixed and the sidewall of the insulator 20 was touched to a guide roller with a load (W). The sidewall was inclined by the weight of the load (W). FIG. 5 also shows an inclined state of the tray-shaped insulator 20'. For the load, a bearing roller having a diameter of 32 mm was used and positioned at 34 mm in height from the bottom face of the insulator 20. The sidewall sloped toward the horizon with the horizontal movement of the bearing roller. A displacement distance x (unit: mm) of the bearing roller was measured, and was adopted as an indicator of the slope. Shape retention property was evaluated according to the following criteria. The measurement was conducted on three insulators, and the average displacement distance of the measurement values were adopted in the evaluation.

Best (◎): the displacement distance per 10 g is less than 1 mm
Good (○): the displacement distance per 10 g ranges from 1 mm to below 2 mm As can be seen from the comparison of Nos. 11, 12, and 15, the shape retention of the molded insulator was lowered with increase of the average particle diameter of the colloidal particles.

The use of chain-like aggregate of colloidal silica (No. 16) had a tendency of higher shape retention property than the use of individually dispersed spherical particles of colloidal silica. However, the quantity of powder remained on the surface of the insulator and adhered to the hand were increased in the case of the aggregate-type colloidal silica, which means poor handling property (Nos. 16 and 17).

Heating and compressing without colloidal silica for one minute could not retain the imparted tray shape. Extension of the heating and compressing time period to 5 minutes made it possible to impart a tray shape in the absence of colloidal silica and retain the shape, but the shape retention property was inferior as compared to the case of the presence of colloidal silica.

With respect to the obtained tray-shaped insulator No. 11 and Reference example 11, the surface of the recessed part of each shaped insulator was observed with a microscope (magnification: 500) and imaged as shown in FIGS. 6 and 7. From the comparison between FIG. 6 (No. 11) and FIG. 7

(Reference example 11), it was confirmed that the colloidal silica had a role of connecting fibers to each other because the crosslinkage between fibers was observed in FIG. 6. Further, in FIG. 6, crosslinking with colloidal silica was often observed in a colloidal silica-coated surface layer, but not hardly observed inside the substrate.

(4) Reference Example 13

An isocyanate (block polyisocyanate "Blonate®" from Daiei Sangyo Kaisha. Ltd.) was used instead of colloidal silica. The isocyanate was sprayed on one surface of the needle-punched mat in an amount of 30% by weight based on the weight of the mat, followed by heating and compressing the mat under the same conditions as No. 11. The release of the resulting molded insulator from the male mold was troublesome due to adhesion to the convex surface of the male mold. Ripping off the molded insulator from the male mold, some fibers derived from the substrate were adhered to the convex surface of the male mold.

[Production of a Metal Foil-Adhering Type Heat Insulator]

A film-forming silica-based binder prepared for the heat insulator No. 1 was sprayed on one surface of the needle-punched mat with an automatic gun. The amount of the film-forming silica-based binder sprayed on the surface was 333 g/m². A metal foil 4 (thickness: 25 μm) was attached to a binder coated surface.

Thereafter, as shown in FIG. 3(c), the metal foil-attached mat was placed on the top of the female mold 6' heated at 300° C., so that the metal foil 4 was positioned at upper side. The male mold 5' mounted over the female mold 6' was heated at 300° C. and pressed against the metal foil 4 for one minute. The applied pressure reduced the thickness of the mat by 35%, which is correspondence to 65% of the thickness ($T_2$) after compression based on the original thickness ($T_1$) as 100%. After keeping the compression state for one minute, the male mold (heated press plate) was released to obtain a tray-shaped heat insulator as shown in FIG. 8. The obtained heat insulator had α=70° and β=85° in inclination angle which is an angle of the sidewall of the tray-shaped insulator to the horizon.

A photograph of the obtained tray-shaped insulator is shown in FIG. 9. The aluminum foil was adhered uniformly to the interior surface of the tray-shaped substrate. Accordingly, the manufacturing method of the invention can impart a stable tray shape on the fibrous substrate.

INDUSTRIAL APPLICABILITY

A high temperature-heat insulator of the invention exhibits excellent heat insulating performance at high temperatures such as 600° C. or higher based on a silica-based inorganic fiber mat as a substrate and an infrared mediator held in a surface part of the substrate. Since the inventive heat insulator exhibits heat resistance inherent in the inorganic fiber as an element of the heat insulator, the heat insulator is useful for insulation of a device such as a catalytic converter required to maintain for high temperatures, as well as an acoustic absorbent and shock absorber used at high temperatures.

Furthermore, a method for manufacturing a three-dimensional shaped article of the invention can produce a molded article having a three-dimensional shape fitting to an exterior shape of the mounted portion in a short time of less than 5 minutes. Accordingly, the productivity can be improved in a manufacturing site for forming into a designed shape. Also it is useful for a user to mount the shaped article on a target device. The shaped insulator can be directly mounted to a structure such as a muffler of an automotive and a fuel cell, and therefore the labor load at a job site is reduced.

Moreover, when a metal foil is used as an infrared mediator, the metal foil can prevent scattering of dust, powder and/or very short fiber derived from silica-based inorganic fiber substrate. Also, the metal foil can prevent adhesion or intrusion of foreign matters from the surroundings to the insulator. Therefore, the heat insulator of the invention is useful for heat insulation for a structure used at high temperatures and exposed to dust in the surroundings, such as a construction, a muffler or silencer of an exhaust system of an automotive.

DESCRIPTION OF CODE 1 substrate
1a silica fiber
2 ceramic powder-containing silica colloid solution
3 silica cured product
3' film-forming silica-based binder
4 metal foil
7, 7' three-dimensionally shaped insulator

The invention claimed is:

1. A high temperature-heat insulator comprising
   a substrate comprising a bulk of silica-based inorganic fiber containing a hydroxyl group;
   a metal foil having a thermal emissivity of 0.3 or less which is held on at least a part of a first surface of the substrate;
   a ceramic particle is held in/on a second surface of the substrate;
   a first silica cured product holding the metal foil on the first surface of the substrate, wherein the first silica cured product is a solidified material of a film-formable fluid containing amorphous silica powder; and
   a second silica cured product holding the ceramic particle on the second surface of the substrate, wherein the second silica cured product is an inorganic polymer containing siloxane bond.

2. The high temperature-heat insulator according to claim 1,
   wherein the substrate is in a form of nonwoven fabric, in which filaments or staples of the silica-based inorganic fiber are tangled.

3. The high temperature-heat insulator according to claim 1,
   wherein the amorphous silica is precipitated silica, dry silica or fumed silica.

4. The high temperature-heat insulator according to claim 1,
   wherein the film-formable fluid contains a layered silicate as a film-forming component.

5. The high temperature-heat insulator according to claim 4,
   wherein the layered silicate is smectite.

6. The high temperature-heat insulator according to claim 1,
   wherein the first silica cured product further comprises a dried sodium silicate.

7. The high temperature-heat insulator according to claim 1,
   wherein the first silica cured product further contains solidified water glass.

8. The high temperature-heat insulator according to claim 1,
wherein the first silica cured product is a dry solidified product of suspension or paste containing amorphous silica powder, layered silicate, water, and water glass.

9. The high temperature-heat insulator according to claim 1,
wherein the ceramic particle has a thermal emissivity of 0.6 to 0.9.

10. The high temperature-heat insulator according to claim 9,
wherein the ceramic particle has an average particle diameter of 0.5 to 4 µm.

11. The high temperature-heat insulator according to claim 1,
wherein the second silica cured product is a dried or solidified material of a colloidal solution in which aggregate of silicon dioxide and the ceramic particle are dispersed in an aqueous dispersion medium.

12. The high temperature-heat insulator according to claim 11,
wherein the aggregate of silicon dioxide is in a form of individually dispersed spherical particle or chain-like aggregate.

13. The high temperature-heat insulator according to claim 1, being in the form of sheet.

14. A high temperature-heat insulator having a three-dimensional shape, the high temperature heat insulator comprising
a substrate having the three-dimensional shape and comprising silica-based inorganic fibers tangled each other and;
a metal foil having a thermal emissivity of 0.3 or less which is held on a first surface of the substrate;
a ceramic particle is held in/on a second surface of the substrate wherein the second surface faces a thermal source to be insulated;
a first silica cured product holding the metal foil on the first surface of the substrate, wherein the first silica cured product is a solidified material containing a layered silicate and amorphous silica powder; and
a second silica cured product holding the ceramic particle on the second surface of the substrate, wherein the second silica cured product is an inorganic polymer containing siloxane bond.

15. A high temperature-heat insulator according to claim 14,
wherein the silica-based inorganic fibers are staples or filaments of a silica-based inorganic fiber containing a hydroxyl group.

* * * * *